US012736612B2

(12) United States Patent
Nadig et al.

(10) Patent No.: US 12,736,612 B2
(45) Date of Patent: Sep. 15, 2026

(54) RESOLVING A MULTIPATH AMBIGUITY IN A TDM-MIMO RADAR

(71) Applicant: Axis AB, Lund (SE)

(72) Inventors: Santhosh Nadig, Lund (SE); Anders Mannesson, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 18/939,468

(22) Filed: Nov. 6, 2024

(65) Prior Publication Data

US 2025/0199113 A1 Jun. 19, 2025

(30) Foreign Application Priority Data

Dec. 19, 2023 (EP) .................................... 23217918

(51) Int. Cl.
*G01S 13/50* (2006.01)
*G01S 7/02* (2006.01)
(Continued)

(52) U.S. Cl.
CPC ............ *G01S 7/0235* (2021.05); *G01S 7/356* (2021.05); *G01S 13/505* (2013.01); *G01S 13/584* (2013.01)

(58) Field of Classification Search
CPC ...... G01S 13/343; G01S 13/42; G01S 13/505; G01S 13/584; G01S 7/0235; G01S 7/03; G01S 7/354; G01S 7/356
See application file for complete search history.

(56) References Cited

U.S. PATENT DOCUMENTS

2019/0310346 A1 10/2019 Lee
2020/0233076 A1* 7/2020 Chen ..................... G01S 13/584
(Continued)

FOREIGN PATENT DOCUMENTS

CA 3222878 A1 2/2023
EP 4343363 A1 3/2024
(Continued)

OTHER PUBLICATIONS

Feng et al., Multipath Ghost Classification for MIMO Radar Using Deep Neural Networks, IEEE Radar Conference, pp. 1-6 (2022).
(Continued)

*Primary Examiner* — Timothy A Brainard
(74) *Attorney, Agent, or Firm* — Volpe Koenig

(57) ABSTRACT

A TDM MIMO FMCW radar comprises at least one row of physical receivers with a first spacing ($d_r$) in a first direction, and further comprises a plurality of physical transmitters arranged with a second spacing ($d_t$) in said first direction. To determine whether a peak in an angle spectrum corresponds to a direct reflection or a first-order multipath artefact, an inverse phase-shift vector corresponding to a phase ($\hat{\phi}_1$) of the peak is applied and a constant signal with the amplitude of the peak is subtracted. To the thus obtained intermediate signal (v), a further inverse phase-shift vector—now corresponding to an offset phase ($\Delta\hat{\phi}$) of the two leading peaks of the angle spectrum—after which a constant signal is subtracted. It is then detected whether the thus obtained test signal (w) has any non-noise content. If yes, the peak corresponds to a multipath artefact, and otherwise to a direct reflection.

12 Claims, 9 Drawing Sheets

(51) Int. Cl.
*G01S 7/35* (2006.01)
*G01S 13/58* (2006.01)

(56) References Cited

U.S. PATENT DOCUMENTS

| | | | |
|---|---|---|---|
| 2021/0325510 | A1 | 10/2021 | Bialer et al. |
| 2022/0114363 | A1 | 4/2022 | Feng et al. |
| 2022/0260672 | A1 | 8/2022 | Zhang et al. |

FOREIGN PATENT DOCUMENTS

| | | | |
|---|---|---|---|
| EP | 4343364 | A1 | 3/2024 |
| JP | 7330423 | B2 | 8/2023 |
| KR | 20230049745 | A | 4/2023 |
| WO | 2023021586 | A1 | 2/2023 |
| WO | 2023021587 | A1 | 2/2023 |

OTHER PUBLICATIONS

Feng et al., Multipath Ghost Recognition for Indoor MIMO Radar, IEEE Transactions on Geoscience and Remote Sensing, vol. 60 (2022).

Park et al., Multipath Signal Mitigation for Indoor Localization Based on MIMO FMCW Radar System, IEEE Internet of Things Journal, vol. 11, No. 2, pp. 2618-2629 (Jan. 2024).

Extended European Search Report, European Patent Applciation No. 23217918.4, dated May 23, 2024.

X. Wan, J. Yi, Z. Zhao and H. Ke, “Experimental Research for CMMB-Based Passive Radar Under a Multipath Environment,” in IEEE Transactions on Aerospace and Electronic Systems, vol. 50, No. 1, pp. 70-85, Jan. 2014.

Korean Office Action issued on Oct. 29, 2025 for Korean Patent Application No. 10-2024-0150426.

* cited by examiner 11
10(TX1)
10(TX2)
$d_t$=4d
21
θ
A
B
C
D
$d_r$=d
20

40(TX1)
30
40(TX2)
A
B
C
D
A
B
C
D
$d_r$
$d_t$

10(TX1)
10(TX2)
10(TX3)
10(TX4)
$D_t$
$d_t$=4d
20
20
A
B
C
D
$d_r$=d

40(TX1)
$d_r$
30
40(TX2)
$D_r$
40(TX3)
40(TX4)
$d_t$ - 2$d_r$
$d_t$
$d_t$+$d_r$

RESOLVING A MULTIPATH AMBIGUITY IN A TDM-MIMO RADAR

TECHNICAL FIELD

The present disclosure is related to signal processing in time-division multiplexing (TDM) multiple-input multiple-output (MIMO) frequency-modulated continuous-wave (FMCW) radar equipment. In particular, it proposes a method for resolving a first-order multipath ambiguity arising in a TDM-MIMO FMCW radar.

BACKGROUND

A radar array may consist of a single physical transmitter and a plurality of physical receivers. The effective number of elements in the physical radar array is equal to the number of physical receivers. The number of elements determines the resolution of a radar array. For example, the angular resolution in angle-of-arrival (AoA) computations improves as the number of elements in the radar array grows.

To increase the effective number of radar array elements, MIMO radar has been proposed. A MIMO radar array has multiple physical receivers as well as $M \geq 2$ physical transmitters, and this gives rise to a virtual radar array with $M_r M$ elements, where $M_r$ is the number of physical receivers. FIG. 1A shows an example setup with two physical transmitters 10 and four physical receivers 20. FIG. 1B shows the resulting virtual array, in which two subarrays 40 of the eight virtual antenna elements 30 can be discerned and traced back to the respective physical transmitters that generated them. Within each subarray 40, further, the spatial configuration of the virtual antenna elements 30 (e.g., geometry, orientation) is identical to the spatial configuration of the physical receivers 20, as emphasized by the consistently used labels A, B, C and D.

The physical transmitters in a MIMO radar may be fed in synchronicity using a multi-carrier signal, such as an orthogonal frequency-division multiplexing signal. As an alternative, to limit expenditure on antenna structures and to be able to feed all physical transmitters from a common signal synthesizer, the concept of a TDM MIMO radar has been proposed, in which the physical transmitters are used in time alternation. FIG. 5 illustrates the operation of a TDM MIMO radar of the frequency-modulated continuous-wave (FMCW) type with M=2 physical transmitters. Here, frequency is plotted against time, wherein the solid and dashed lines refer to chirps transmitted from a first and second physical transmitter, respectively. The symbol $T_c$ denotes the chirp length, $T_r$ the chirp repetition time, and $T_f = MT_r$ the chirp repetition period for the same transmit antenna. The frequency axis does not necessarily start at the origin. In a representative millimeter-wave radar, each chirp sweeps from 77 GHz to 81 GHZ and for a duration of $T_c = 40$ μs.

Although the MIMO FMCW radars are popular due to their ability to achieve high angular resolution with a relatively small number of transmit and receive antennas, they perform poorly in certain known circumstances. For example, a radar that monitors a moving object in a scene with many static reflective surfaces (or scatterers, such as metallic fences, parked vehicles, building walls and doors) may be receiving both the intended echo along the line of sight to the moving target (target detection) and unwanted further echoes which originate from reflections of the scatterers (multipath detections). In FIG. 6, the path R-T-R, drawn in solid line, corresponds to the target detection, and the dotted paths R-T-S-R and R-S-T-R correspond to a multipath detection. The echoes originating from multipath detections are undesirable from a measuring perspective but may also have negative secondary effects, such as when a recipient of the radar signal wrongly detects that a person in the scene has entered a prohibited area (but this is actually the echo of the person) and triggers a costly false alarm, or when a target-tracking algorithm gets confused by an unlikely sudden movement (which is actually the appearing of the target's echo).

The problem of discriminating a target detection from a first-order multipath detection is addressed by the patent applications WO2023021586A1 and WO2023021587A1. Further reference is made to the research paper Jeong-Ki Park, Jae-Hyun Park and Kyung-Tae Kim, "Multipath Signal Mitigation for Indoor Localization Based on MIMO FMCW Radar System", which has been accepted for publication in the *IEEE Internet of Things Journal.*

US20200233076A1 discloses methods and apparatus to implement time-frequency division multiplexing for MIMO radar. An known shortcoming of some conventional MIMO radars is that the reflected signal may leak into the cross-correlation window of the next antenna, to appear as a phantom target at a closer range than the actual reflector. To suppress such phantom targets, The proposal in US20200233076A1 is to apply a slow time phase coding scheme to scramble each chirp within each chirp cycle of a full circular chirp cycle radar frame. Specifically, a random scrambling code is applied to each transmitted chirp over K chirp cycles of a radar frame. The conjugate of the scrambling code is applied to the range response for the assumed transmitter, which allows the phase term of the signal to be recovered.

SUMMARY

One objective of the present disclosure is to make available a computationally efficient method for resolving a multipath ambiguity for a virtual array of a TDM MIMO radar. A further objective is to propose such a method which can be executed without access to dynamic information about the monitored scene that the radar monitors. (It is appreciated that the execution of the method may require certain static information about the radar, such as the geometry of its physical receivers and transmitters, and indications about the waveform and/or spectrum of the transmitted signal.) A further objective is to propose a multipath ambiguity resolution method with good robustness, that is, one which performs reliably across a wide range of imaging conditions. A still further objective is to make available a signal processing device and computer program that perform phase ambiguity resolution.

At least some of these objectives are achieved by the present invention as defined by the independent claims. The dependent claims relate to advantageous embodiments of the invention.

In a first aspect of the present disclosure, there is provided a method of resolving a first-order multipath ambiguity for a virtual array of a TDM MIMO FMCW radar. It is understood that the TDM MIMO FMCW radar comprises at least one row of physical receivers with a first spacing $d_r$ in a first direction, and further comprises a plurality of physical transmitters arranged with a second spacing $d_t$ in said first direction. The method comprises: obtaining a virtual array signal x relating to a scene, each element of the virtual array signal corresponding to one virtual antenna element of the virtual array; computing an angle spectrum for a range-Doppler bin $Z^{(i,j)}$ of the virtual array signal; providing an intermediate signal v representing a first leading peak in the angle spectrum (i.e., one of the leading peaks, such as the largest or second largest peak in the angle spectrum); providing a test signal w; and detecting non-noise content of the test signal. At this point, if the test signal has non-noise content, it is concluded that the virtual array signal contains a first-order multipath artefact, and, if the test signal has noise content only, it is concluded that the first leading peak corresponds to a direct reflection in the scene. In the method, the intermediate signal v can be provided by selecting said first leading peak in the angle spectrum of the virtual array signal, applying to the range-Doppler bin an inverse phase-shift vector $$a_t^*(\hat{\phi}_1) \otimes a_r^*(\hat{\phi}_1)$$

corresponding to an estimated phase $\hat{\phi}_1$ of the first leading peak, and subtracting a constant signal with an amplitude corresponding to the first leading peak. Further, the test signal w may be provided by applying to the intermediate signal an inverse phase-shift vector $$a_t^*(\hat{\phi}_1) \otimes a_r^*(\hat{\phi}_1)$$

corresponding to an estimated offset phase $\Delta\hat{\phi}$, which relates the first and a second leading peak in the angle spectrum of the virtual array signal (e.g., the two largest peaks in the angle spectrum), and subtracting a constant signal.

As shown by this method, the inventors have developed a very simple test for determining whether the leading peak is a first-order multipath artefact or a direct reflection. The only dynamic information required for executing the test is the difference of the phases of the leading peaks in the angle spectrum, which is information comparatively easily to obtain, i.e., without heavy computations or nonstandard input data. When the inverse phase-shift vector $$a_t^*(\hat{\phi}_1) \otimes a_r^*(\hat{\phi}_1)$$

corresponding to this estimated offset phase is applied to the intermediate signal, it will be zero (plus noise) if the first leading peak is an artefact, and non-zero if the first leading peak is a direct reflection. These two outcomes will be demonstrated mathematically below. An immediate technical advantage of the method of to the first aspect is that artefacts can be eliminated from the radar signal. A secondary technical advantage is that radar-based object detection becomes more reliable (false positives are suppressed). Furthermore, when radar signal postprocessed according to the method of the first aspect is used to control technical systems, the controlling becomes more economical as less resources are wasted on false positives and possibly more stable over time.

In some embodiments, the offset phase $\Delta\hat{\phi}$ is computed based on the angle spectrum of the virtual array signal x. This may include computing the phase difference of the two leading peaks, e.g., by converting the angles $\theta_1$, $\theta_2$ of the leading peaks into two phases, $$\phi_1 = \frac{2\pi}{\lambda}\sin\theta_1,\ \phi_2 = \frac{2\pi}{\lambda}\sin\theta_2, \tag{1}$$

where $\lambda$ is a wavelength, and subtracting:

$$\Delta\hat{\phi} = \frac{2\pi}{\lambda}(\sin\theta_2 - \sin\theta_1).$$

Alternatively, in other embodiments, the offset phase $\Delta\hat{\phi}$ is instead computed based on the angle spectrum of the intermediate signal v. More precisely, the offset phase $\Delta\hat{\phi}$ corresponds to an estimated angle $\theta_0$ of the leading peak in the angle spectrum, as per $$\Delta\hat{\phi} = \frac{2\pi}{\lambda}\sin\theta_0. \tag{1'}$$

Hypothetically, if the intermediate signal v was a virtual array signal, the angle $\theta_0$ would be interpreted as the AoA of an object in the scene to which the intermediate signal v related. In these embodiments, further, the constant signal subtracted from the intermediate signal v may have an amplitude corresponding to the selected leading peak in the angle spectrum of the intermediate signal v.

In some embodiments, the detection of non-noise content includes a ratio test which compares a signal energy of the selected leading peak and a total signal energy. In particular, the ratio test may include a comparison of the signal energy of the constant signal subtracted from the intermediate signal (numerator) and the total signal energy of the intermediate signal v (denominator). Alternatively, in other embodiments, the detection of non-noise content can be performed subject to a noise floor obtained for the virtual array signal. This is an advantageously simple way of determining the noise floor of the test signal, which is derived from the virtual array signal by a sequence of operations that—according to the inventors' realization—may be expected to leave the noise floor unchanged.

In further developments of the method of the first aspect, provision is made for an exceptional case (degeneracy) where the offset phase $\Delta\hat{\phi}$ corresponds to an AoA giving rise to a path-length difference equal to an integer number of wavelengths with respect to the first spacing $d_r$ of the physical receivers or to an AoD giving rise to a path-length difference equal to an integer number of wavelengths with respect to the second spacing $d_t$ of the physical transmitters. The criterion on an integer number of wavelengths may be formulated as $d_r \sin\theta_0=\lambda n$ or $d_t \sin\theta_0=\lambda n'$, where the left-hand side represents a path-length difference and $n, n' \in \mathbb{Z}$. Substituting (1), the two conditions are seen to be equivalent to $d_r\Delta\hat{\phi}=2\pi n$ or $d_t\Delta\phi=2\pi n'$. If it is determined that this exceptional case is at hand, the execution of the method may be aborted. Optionally, a user notification that the method is unable to reliably resolve the first-order multipath ambiguity may be provided.

In a second aspect of the present disclosure, there is provided a method of resolving a first- or second-order multipath. The method comprises: obtaining a virtual array signal x relating to a scene, each element of the virtual array signal corresponding to one virtual antenna element of a virtual array of a TDM MIMO FMCW radar as specified above; computing an angle spectrum for one range-Doppler bin of the virtual array signal; and counting the number of peaks in the angle spectrum. If the angle spectrum has a single peak, it is concluded that the angle spectrum corresponds to a second-order multipath artefact or a direct reflection in the scene. If instead the angle spectrum has at least two peaks, it is concluded that it corresponds to two first-order multipath artefacts or two direct reflections in the scene; with this outcome, the method of the first aspect is performed.

The second aspect allows a more complete evaluation of the virtual array signal, with an ability to discriminate direct reflections from first-order as well as second-order multipath artefacts.

In a third aspect of the present disclosure, there is provided a signal processing device for a TDM MIMO FMCW radar with the characteristics stated above. The signal processing device comprises processing circuitry configured to resolve, in a virtual array signal comprising at least one range-Doppler bin, a first-order multipath ambiguity for a virtual array of the TDM MIMO FMCW radar by performing the method of the first aspect.

The signal processing device according to the third aspect generally shares the advantages of the method of the first aspect, and it can be implemented with an equal degree of technical variation.

The invention further relates to a computer program containing instructions for causing a computer, or the signal processing device in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

Figures 1A, 1B, 2A, 2B:
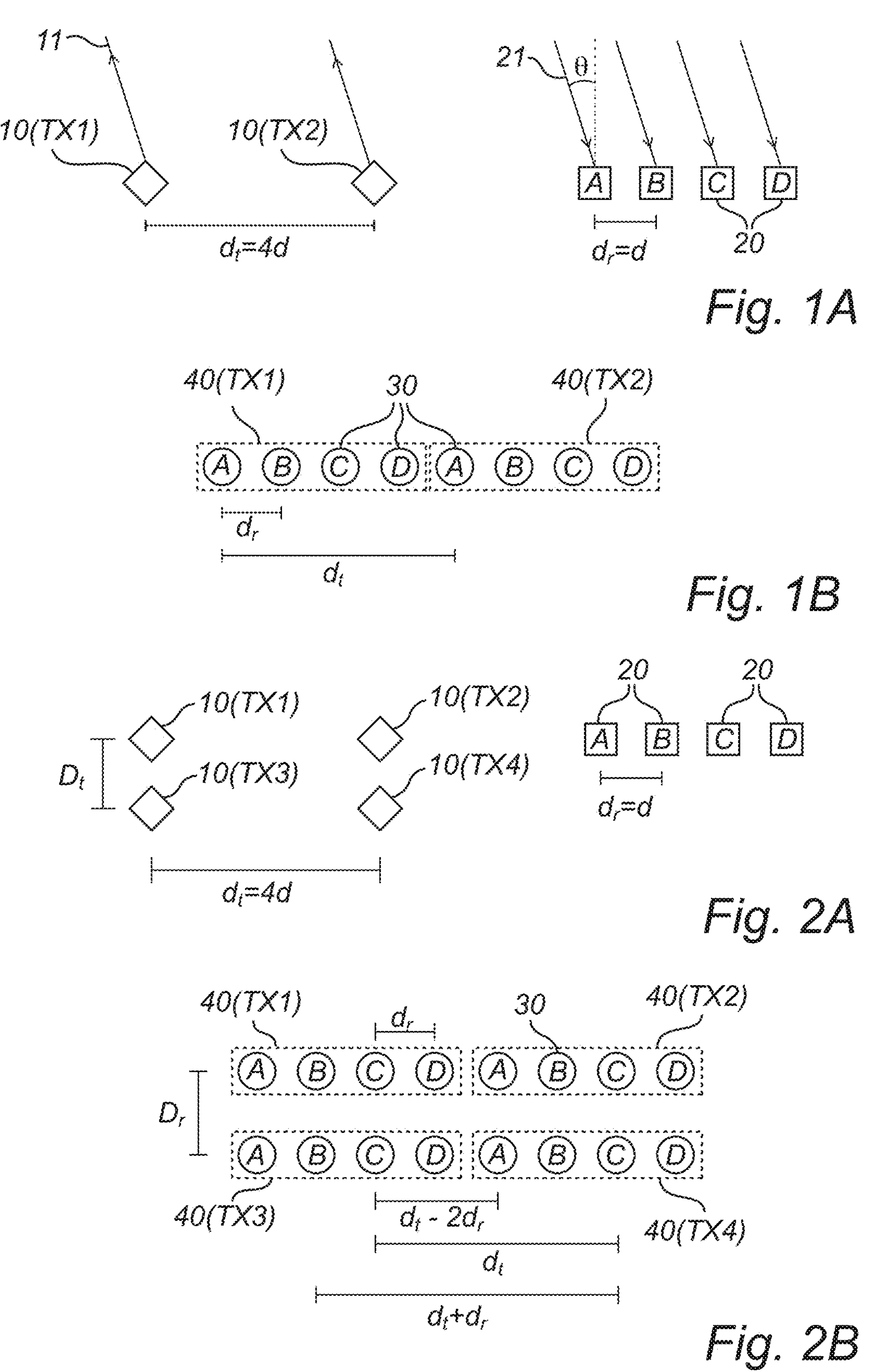
FIGS. 1A-1B shows one-dimensional arrays of physical transmitters and physical receivers and a resulting one-dimensional virtual array.
FIGS. 2A-2B shows a two-dimensional array of physical transmitters, a one-dimensional array of physical receivers and a resulting two-dimensional virtual array.

FIG. 1A shows a one-dimensional array of physical transmitters 10, configured to transmit a radio-frequency (RF) beam 11 towards a scene and a one-dimensional array of physical receivers 20 configured to receive a RF 21 beam reflected by an object (not shown) in the scene. It is appreciated that a complete radar equipment may include, in addition to the physical transmitters 10 and physical receivers 20, the functional stages mixing, analog-to-digital conversion, radio-frequency frontend processing (on the basis of the IF signal) and digital beamforming, as enumerated from the antenna end onwards. The physical transmitters 10 are used according to a configured transmission schedule, here corresponding to the repeating sequence TX1, TX2.

Relative to the main direction of transmission and receipt (main lobe), corresponding to the vertical direction on the drawing, the reflecting object is viewed under an angle θ. The angle θ corresponds to the AoA of the object. For the avoidance of doubt, the physical transmitters 10 are typically configured to transmit in all directions over a nonzero angular range, which include the direction in the angle θ but are not limited to it. As indicated in FIG. 1A, further, the physical transmitters 10 are spaced by $d_t$=4d units, for some constant d, and the physical receivers 20 are equidistant with a spacing of $d_r$=d units.

With reference to the appended patent claims, it is noted that the physical transmitters 10 and the physical receivers 20 in FIG. 1A fulfil the requirement of having a nonzero spacing in a common first direction, the horizontal direction in FIG. 1A. While the row of physical transmitters 10 and row of physical receivers 20 in FIG. 1A are even arranged oriented parallel to each other, this is not essential for the applicability of the method 700. In fact, the requirement is fulfilled as soon as the physical transmitters 10 and the physical receivers 20 each have a spacing with a nonzero component in a common first direction, as would be still the case, say, if the row of physical receivers 20 was slanted upwards relative to the row of physical transmitters 10.

FIG. 1B shows a one-dimensional virtual array of virtual array elements 30, which is generated when the array of physical transmitters 10 is operated in conjunction with the array of physical receivers 20. The virtual array is generated in the sense that, during one chirp repetition period $T_f$, measurement data is read from each physical receiver 20 once for each active physical transmitter 10. (It is recalled that data from a plurality of chirp repetition periods is normally required for any velocity computation, e.g., for the providing of a Doppler FFT. In other words, data is collected from multiple chirps for each virtual array element.) The measurement data thus collected, a virtual array signal, may be organized as a matrix X with dimensions equal to the dimensions of the virtual array. In the 1×8 case illustrated in FIG. 1B, the appearance of this matrix can be:

$$X=[x_{TX1,A}\ x_{TX1,B}\ x_{TX1,C}\ x_{TX1,D}\ x_{TX2,A}\ x_{TX2,B}\ x_{TX2,C}\ x_{TX2,D}], \quad (2)$$

where $x_{TX1,A}$ denotes measurement data read from the physical receiver 20 labeled A while it is excited by the first physical transmitter 10 (TX1), $x_{TX2,A}$ denotes measurement data read from the same physical receiver 20 while excited by the second physical transmitter 10 (TX2), and so forth. It may be considered that the virtual array in FIG. 1B is divided into two subarrays 40, which are each in a one-to-one relationship with the physical transmitter 10 that provides the excitation. Each measurement data entry in X may be, for example, a digital representation of an intermediate-frequency (IF) signal obtained by mixing the signal fed to the physical transmitter 10 with the signal received from the physical receiver 20. The digital representation may for instance be a row matrix of time samples. Further, each entry in X may be a data structure collecting measurement data from a plurality of radar chirps; for example, the measurement data entry may be represented as a matrix where the chirps correspond to rows.

Apart from the frequency folding, to be addressed below, the virtual array signal X is normally indistinguishable from a physical array signal collected by a 1×8 array of physical receivers excited by a single physical transmitter.

Within each subarray 40, the geometry and orientation of the array of physical receivers 20 is preserved, including their spacing $d_r$. This is visualized by using the same labels A, B, C, D for the physical receivers 20 and for the virtual antenna elements 30 of each subarray 40. Two virtual antenna elements 30 in different subarrays 40 which have been generated by the same physical receiver 20 will be referred to as homologous in the present disclosure. In the figures, two homologous virtual antenna elements 30 share the same label, e.g., A. The spacing of the subarrays 40 is equal to the spacing of the physical transmitters 10, that is, $d_t$ units in the first direction.

The effects of using a two-dimensional array of physical transmitters 10 or a two-dimensional array of physical receivers 20, or both, will be briefly discussed with reference to the examples in FIGS. 2, 3 and 4. As will become apparent from these examples, the virtual array generated by an array of physical transmitters 10 and an array of physical receivers 20 corresponds to a convolution of these two arrays. For a general introduction to the structure and operation of MIMO radars, reference is made to S. Rao, "MIMO Radar", Application Report SWRA554A, Texas Instruments Incorporated, Dallas TX, July 2018.

In FIG. 2A, the array of physical transmitters 10 has two rows and two columns. The column spacing is $d_t$=4d units (first direction, horizontal on the drawing) and the row spacing is $D_t$ units (second direction, vertical on the drawing). The array of physical receivers 20 has dimension 1×4, with a spacing of $d_r$=d units. While the physical transmitters 10 in FIG. 2A are arranged in two orthogonal directions, this orthogonality is by no means essential for the applicability of the present invention. Rather, a spacing with a nonzero component in the first or second direction, as applicable, is sufficient.

The resulting virtual array, with four subarrays 40, is shown in FIG. 2B, where example inter-element spacings are indicated. The spacing in the first direction of consecutive virtual antenna elements inside a subarray 40 is equal to the spacing of the physical receivers 20, $d_r$ units. The spacing in the first direction between homologous virtual antenna elements 30 belonging to a pair of subarrays is either $d_t$ units (in the pairs TX1-TX2 and TX3-TX4) or zero (in the pairs TX1-TX3 and TX2-TX4). The spacing with respect to the second direction is not more than $d_t$ units for any pair of homologous virtual antenna elements 30. The spacing in the second direction between homologous virtual antenna elements 30 belonging to a pair of subarrays is either zero (in the pairs TX1-TX2 and TX3-TX4) or $D_t$ units (in the pairs TX1-TX3 and TX2-TX4). The spacing between any pair of non-homologous virtual antenna elements, in the first or second direction, can be computed as linear combinations of these basic distances. For example, the distance between the second virtual antenna element B in the third subarray 40 (TX3) and the third virtual antenna element C in the fourth subarray 40 (TX4) is $d_t$+$d_r$ units. Similarly, the distance between the third virtual antenna element C in the third subarray 40 (TX3) and the first virtual antenna element A in the fourth subarray 40 (TX4) is $d_t$−2$d_r$ units.

A virtual array signal collected using the virtual array in FIG. 2B may be represented as a 2×8 matrix with the following general appearance:

$$X=\begin{bmatrix} x_{TX1,A} & x_{TX1,B} & x_{TX1,C} & x_{TX1,D} & x_{TX2,A} & x_{TX2,B} & x_{TX2,C} & x_{TX2,D} \\ x_{TX3,A} & x_{TX3,B} & x_{TX3,C} & x_{TX3,D} & x_{TX4,A} & x_{TX4,B} & x_{TX4,C} & x_{TX4,D} \end{bmatrix}. \quad (3)$$

Alternatively, the matrix elements may be arranged in a single row. This way, data from different chirps can correspond to different rows of the matrix.

Figure 3A:
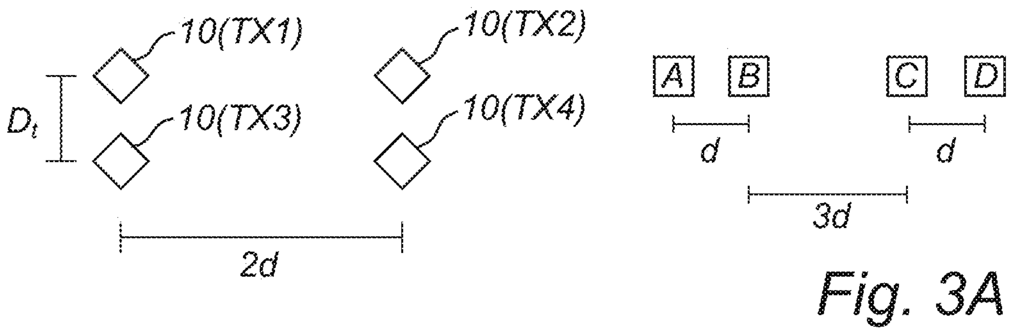
FIGS. 3A-3B shows a two-dimensional array of physical transmitters, a one-dimensional array of physical receivers and a resulting two-dimensional virtual array.
Figure 3B:
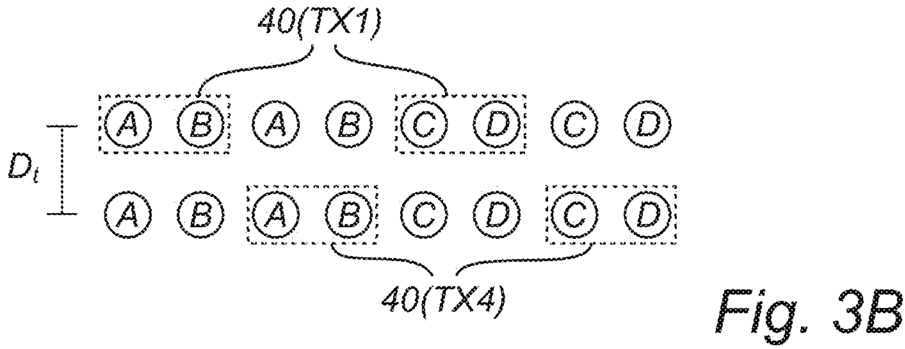

In FIG. 3A, the physical transmitters 10 are arranged with a different column spacing than in FIG. 2A, 2*d* units in the first direction, and the row of physical receivers 20 are spaced sequentially by d, 3d and d units. The resulting virtual array, as shown in FIG. 3B, will have the same dimension 2×8 as the virtual array in FIG. 2B, though with a different subarray structure. The first subarray 40 (TX1) comprises the first, second, fifth and sixth virtual antenna elements 30 on the first row of the virtual array; and the second subarray comprises the third, fourth, seventh and eighth virtual antenna elements on the first row. The virtual antenna elements 30 on each row are equidistant, with a spacing of d.

Figure 4A:
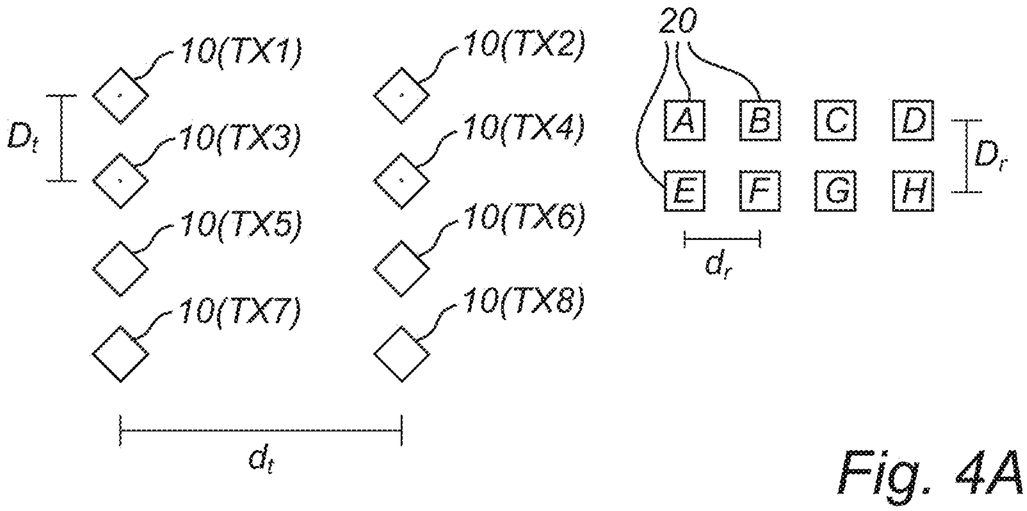
FIGS. 4A-4B shows two-dimensional arrays of physical transmitters and physical receivers and a resulting two-dimensional virtual array.
Figure 4B:
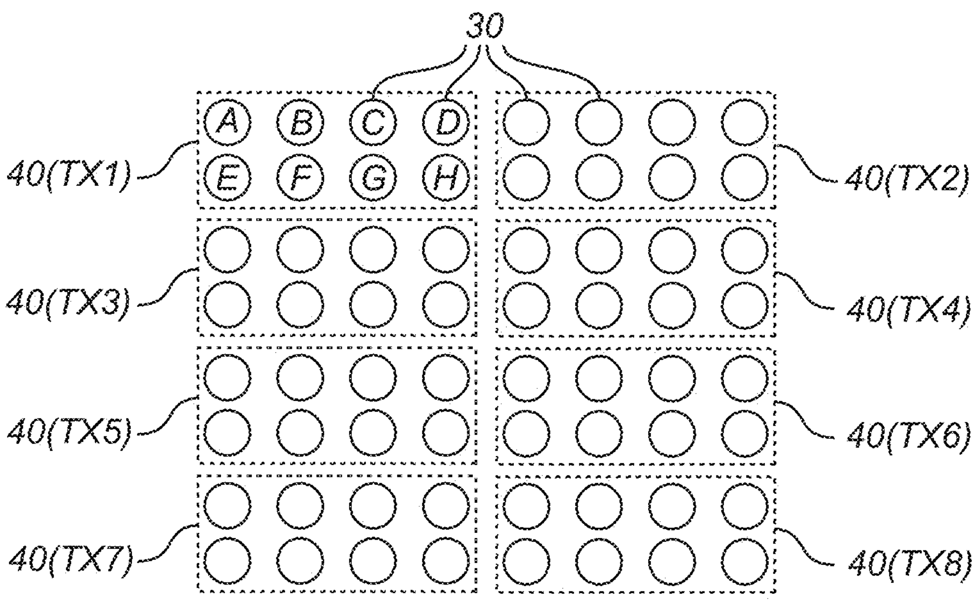
Figure 5:
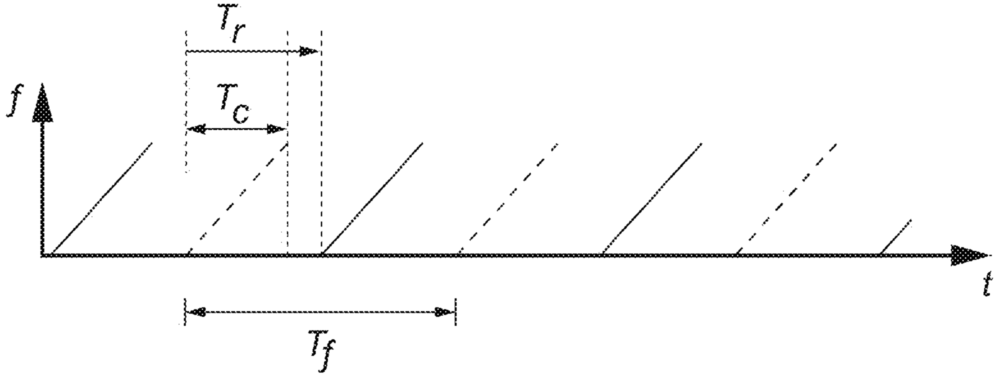
FIG. 5 is a plot of frequency versus time for two physical transmitters in TDM operation.

FIG. 4A, finally, shows a case where both the physical transmitters 10 and the physical receivers 20 are arranged in a two-dimensional pattern. More precisely, the physical transmitters 10 and physical receivers 20 are arranged with a nonzero spacing in the first direction (horizontal) as well as the second direction (vertical). The resulting virtual array is shown in FIG. 4B. Here, to avoid unnecessary repetition, only the virtual array elements 30 in the first subarray 40 (TX1) have been labeled in accordance with the physical receivers 20, by letters A, B, C, . . . , H. It is understood that this structure, and thus the homology relations, repeats identically in the seven further subarrays 40. The spacings $d_t$, $d_r$, $D_t$, $D_r$ in FIG. 4A can be assigned any values. To make the virtual antenna elements 30 equidistant in the first direction, one may set $d_t/d_r=4$. Similarly, equidistant spacing in the second direction will be obtained if $D_t/D_r=2$.

Figure 7:
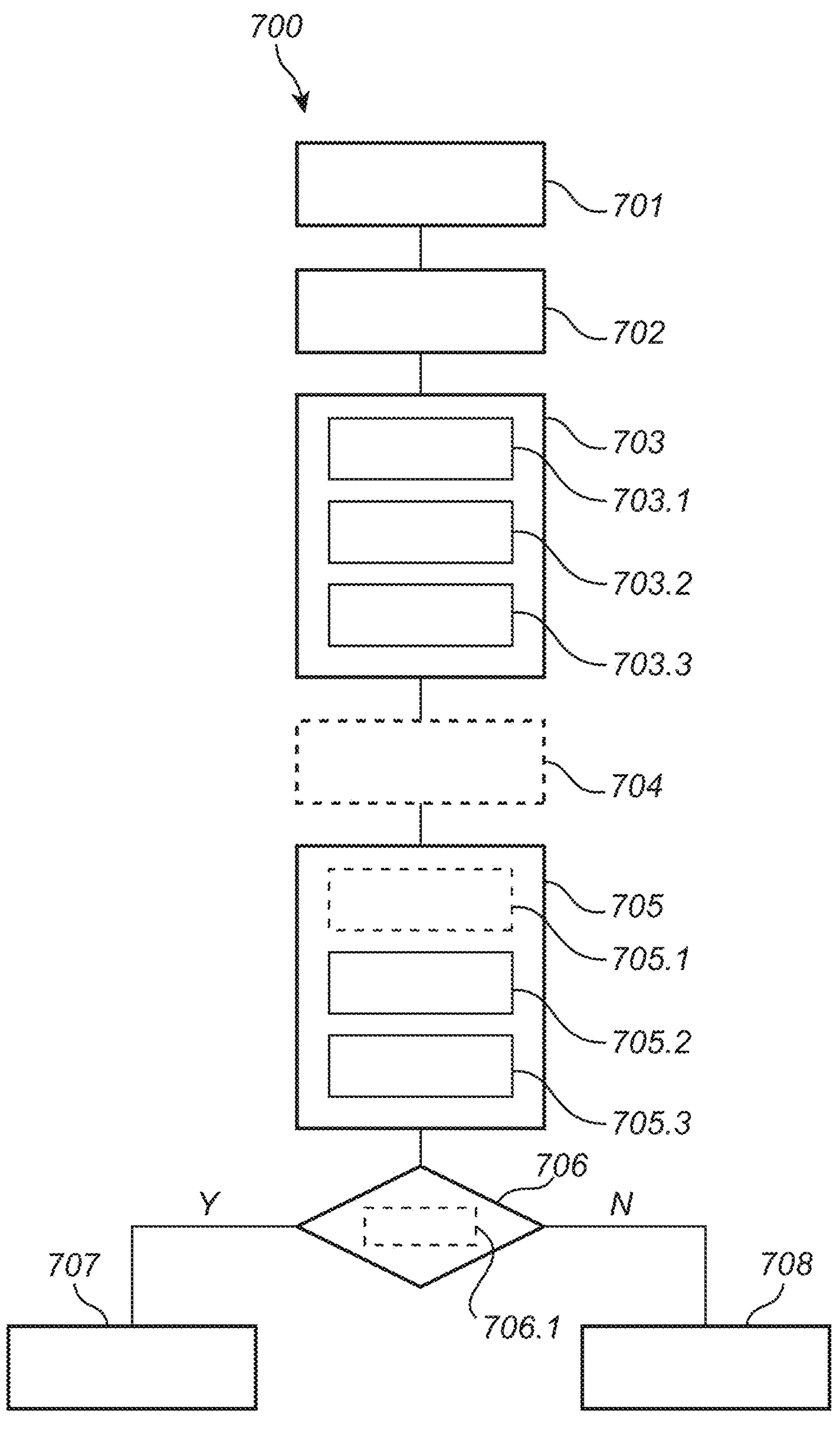
FIG. 7 is a flowchart of a method for resolving a first-order multipath ambiguity for a virtual array of a TDM MIMO FMCW radar, according to embodiments herein.

A method 700 for resolving a first-order multipath ambiguity for a virtual array of a TDM MIMO FMCW radar will now be described with reference to the flowchart in FIG. 7. The method 700 takes as input a virtual array signal of a range-Doppler bin. As such, it is possible to execute the method 700 on a general-purpose processor with generic data input and data output capabilities. A possible application of the method 700 is in target detection or target following, and more precisely in order to identify artefacts for thereby avoiding confusing them with actual targets in the scene. Further, the artefacts may be eliminated before the data from the TDM MIMO FMCW radar are used in subsequent processing and/or before the data are presented to a user.

Alternatively, a signal processing device with processing circuitry configured to perform the method 700, through programming or hardcoding, may be used. The processing circuitry may for example be general-purpose (programmable) circuitry with one or more processing cores, an application-specific integrated circuit (ASIC), a field-programmable gate array (FPGA) or a system-on-chip. It is recalled that a radar signal processing chain may include the following sequence of functional stages, starting from the antenna side: mixing, analog-to-digital conversion, radio-frequency frontend processing (on the basis of the IF signal) and digital beamforming. Different processing chains may integrate these stages to different degrees. As such, the signal processing device performing the method 700 may be adapted for deployment as a general-purpose radar baseband processor, as a combined frontend and beamforming device, or as a dedicated digital beamforming device.

In a first step 701 of the method 700, a virtual array signal relating to a scene is obtained. The virtual array signal may represent one range-Doppler bin, which is an element of a range-Doppler spectrum. The range-Doppler bin may be selected because a two-dimensional peak search suggests that it contains a moving or stationary object. A virtual array signal representing a range-Doppler bin has as many elements as there are there are elements in the virtual array of the TDM MIMO radar, this number being denoted $M_rM$. Such a virtual array signal may be obtained from plurality of IF signals corresponding to a plurality of chirps and to each virtual array element of the virtual array. In the present disclosure, the term virtual array signal is used to refer to a signal which has one value for each virtual array element of a virtual array. In the example of the virtual array depicted in FIG. 1A, the IF signal for the leftmost virtual array element (i.e., data collected by the first physical receiver 20 (label A) when excited by the first physical transmitter 10(TX1)) and six chirps c0, c1, . . . , c5 may have the following schematic structure:

$$x_{TX1,A} = \begin{bmatrix} x_{TX1,A}^{c0,t0} & x_{TX1,A}^{c0,t1} & x_{TX1,A}^{c0,t2} & x_{TX1,A}^{c0,t3} & x_{TX1,A}^{c0,t4} & x_{TX1,A}^{c0,t5} & x_{TX1,A}^{c0,t6} & x_{TX1,A}^{c0,t7} \\ x_{TX1,A}^{c1,t0} & x_{TX1,A}^{c1,t1} & \cdots & & & & & \vdots \\ x_{TX1,A}^{c2,t0} & \vdots & & & & & & \\ x_{TX1,A}^{c3,t0} & & & & & & & \\ x_{TX1,A}^{c4,t0} & & & & & & & \\ x_{TX1,A}^{c5,t0} & \cdots & & & & & & x_{TX1,A}^{c5,t7} \end{bmatrix}, \tag{4}$$

where t0, t1, . . . , t7 is a discretization of the interval $[0,T_c]$. (In realistic implementations, the discretization may be finer and the computations may be based on data from a larger number of chirps.) Each row of $x_{TX1,A}$ corresponds to one of the chirps, and each entry can be understood as a time sample for that chirp. Range information can be obtained by applying a discrete harmonic transform, for example DFT or FFT, to each row of the IF signal. If FFT is used, this produces the following range spectrum (a "range FFT"):

$$y_{TX1,A} = \begin{bmatrix} y_{TX1,A}^{c0,r0} & y_{TX1,A}^{c0,r1} & y_{TX1,A}^{c0,r2} & y_{TX1,A}^{c0,r3} & y_{TX1,A}^{c0,r4} & y_{TX1,A}^{c0,r5} & y_{TX1,A}^{c0,r6} & y_{TX1,A}^{c0,r7} \\ y_{TX1,A}^{c1,r0} & y_{TX1,A}^{c1,r1} & \cdots & & & & & \vdots \\ y_{TX1,A}^{c2,r0} & \vdots & & & & & & \\ y_{TX1,A}^{c3,r0} & & & & & & & \\ y_{TX1,A}^{c4,r0} & & & & & & & \\ y_{TX1,A}^{c5,r0} & \cdots & & & & & & y_{TX1,A}^{c5,r7} \end{bmatrix} \tag{5}$$

The row dimension of this matrix now corresponds to range, wherein r0, r1, . . . , r7 may be interpreted as range bins, intervals on the radial distance to the reflecting object. The column dimension still corresponds to the six chirps, and all information in the matrix has been derived from measurement data read from the leftmost virtual array element in FIG. 1B. By applying a further FFT to each column of $y_{TX1,A}$, a range-Doppler spectrum (or "Doppler FFT") is obtained:

$$z_{TX1,A} = \begin{bmatrix} z_{TX1,A}^{v0,r0} & z_{TX1,A}^{v0,r1} & z_{TX1,A}^{v0,r2} & z_{TX1,A}^{v0,r3} & z_{TX1,A}^{v0,r4} & z_{TX1,A}^{v0,r5} & z_{TX1,A}^{v0,r6} & z_{TX1,A}^{v0,r7} \\ z_{TX1,A}^{v1,r0} & z_{TX1,A}^{v1,r1} & \cdots & & & & & \vdots \\ z_{TX1,A}^{v2,r0} & \vdots & & & & & & \\ z_{TX1,A}^{v3,r0} & & & & & & & \\ z_{TX1,A}^{v4,r0} & & & & & & & \\ z_{TX1,A}^{v5,r0} & \cdots & & & & & & z_{TX1,A}^{v5,r7} \end{bmatrix} \tag{6}$$

Each entry in the matrix $Z_{TX1,A}$, generally a complex number, may be understood as an element in a discrete representation of the range-Doppler spectrum. A superscript such as $v_i$, $r_j$ shall be understood as referring to the $i^{th}$ velocity (or Doppler) bin and the $j^{th}$ range bin or, for short, the $(i,j)^{th}$ range-Doppler bin. It is noted that the velocity is a signed quantity, in the sense that the range-Doppler spectrum allows movement radially towards the radar to be distinguished from movement radially away from it.

One range-Doppler bin of the virtual array signal, which forms the input to the processing in step 702 of the method 700, can be represented as the following vector:

$$Z^{(i,j)} = \left[z^{vi,rj}_{TX1,A} \quad z^{vi,rj}_{TX1,B} \quad z^{vi,rj}_{TX1,C} \quad z^{vi,rj}_{TX1,D} \quad z^{vi,rj}_{TX2,A} \quad z^{vi,rj}_{TX2,B} \quad z^{vi,rj}_{TX2,C} \quad z^{vi,rj}_{TX2,D}\right], \quad (7)$$

where each element is a range-Doppler bin, i.e., a matrix entry from equation (6), for a virtual antenna element 30 of the virtual array. In the continued computations to be discussed below, the virtual array signal of the range-Doppler bin will be denoted z for simplicity, where the indices (i,j) are implicit. The phase shift between the elements is given as a sum of the velocity-induced phase shift and an AoA-induced phase shift. The AoA-induced phase shift can be observed when the AoA is nonzero in the plane of the virtual antenna array, as a result of path differences between the virtual array elements. Before computing an angle spectrum, preprocessing aiming to eliminate the velocity-induced phase shift may be performed; this is not an essential element of the invention. In fact, because specialized hardware (e.g., chipsets, optionally integrated in the TDM MIMO radar equipment) for computing the range-Doppler spectrum exists, and thus there are ways of obtaining the virtual array signal of the range-Doppler bin which do not include executing the computations outlined above, step 701 of the method 700 should be considered completed as soon as the data according to equation (7) is available.

Figure 6:
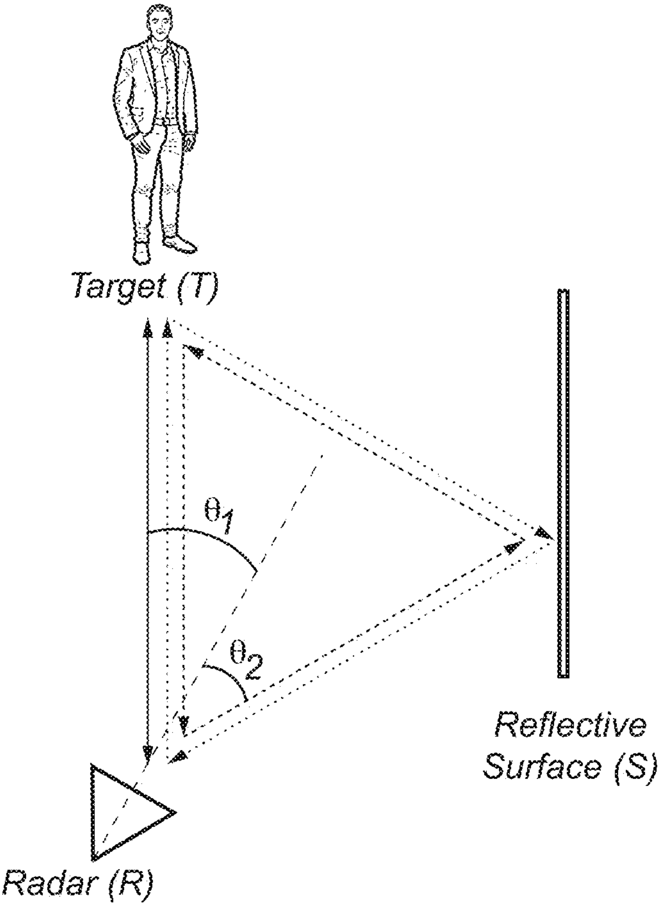
FIG. 6 illustrates target detection and first-order multipath detection.

The expected content of this data may be understood by considering FIG. 6, which illustrates target detection and first-order multipath detection. The path R-T-R, drawn in solid line, corresponds to the target detection, i.e., a direct reflection on a physical object in the scene. In this case, the angle of departure (AoD) and angle of arrival (AoA) are identical and equal to 01. For the first-order multipath reflection, however, the receiver receives echoes from two paths of identical lengths, R-T-S-R and R-S-T-R, which are both drawn in dotted line styles. The first path has an AoD of $\theta_1$ and an AoA of $\theta_2$. Conversely, the second path has an AoD of $\theta_2$ and an AoA of $\theta_1$. The observation that the AoD and AoA are different for a multipath reflection is key to the method 700 proposed herein.

The content of the virtual array signal z can be expressed in terms of transmit and receive steering vectors. Then the virtual antenna elements of the virtual array are equidistant in the first direction, these steering vectors have the following appearance:

$$a_t(\phi) = \left[1 \;\; e^{jd_t\phi} \;\; e^{j2d_t\phi} \;\; \ldots\right]$$
$$a_r(\phi) = \left[1 \;\; e^{jd_r\phi} \;\; e^{j2d_r\phi} \;\; \ldots\right]$$

where $d_r$, $d_r$ are the separations introduced above and each steering vector has $M_r$M elements. For the target detection, the virtual array signal is:

$$z_{two}(\phi_1, \phi_2) = s_1[a_t(\phi_1) \otimes a_r(\phi_1)] + s_2[a_t(\phi_2) \otimes a_r(\phi_2)] + n, \quad (8)$$

where $\otimes$ denotes Kronecker product, $\phi_1$, $\phi_2$ are phases computed using (1), and $n \sim \mathcal{N}(0,\sigma^2 I)$ is a noise term with variance $\sigma^2$. The amplitudes $s_1$, $s_2$ are real or complex numbers. Throughout this presentation, the symbol n will refer to any noise term (noise vector) with the probability distribution $\mathcal{N}(0, \sigma^2 I)$. In other words, different noise terms (e.g., n and $e^{j\phi}n$) will not be distinguished notationally unless they have different probability distributions. For first-order multipath reflection, the sum of the virtual array signals is:

$$z_{mp}(\phi_1, \phi_2) = s_{12}[a_t(\phi_1) \otimes a_r(\phi_2)] + s_{21}[a_t(\phi_2) \otimes a_r(\phi_1)] + n. \quad (9)$$

In a second step 702 of the method 700, the angle spectrum is computed based on the phase shifts among the radar array elements in (7), e.g., by performing an angle-FFT or AoA-FFT. Phrased more completely, step 702 includes a computation of the angle spectrum of those elements of the virtual array signal which correspond to consecutive virtual antenna elements generated by physical receivers belonging to the same row. The angle spectrum indicates an amplitude for each AoA, and this allows detection of all objects in the scene that have a distance and radial velocity in said (i,j)th range-Doppler bin, including multipath artefacts.

In a third step 703, an intermediate signal v is provided on the basis of information from the angle spectrum and the virtual array signal z of the (i,j)th range-Doppler bin.

This includes a substep 703.1 of selecting a first leading peak in the angle spectrum of the virtual array signal and estimating a phase $\phi_1$ of the first leading peak. The first leading peak shall be one of the peaks with the greatest amplitudes in the angle spectrum, such as the peak with the greatest or second greatest amplitude. With a view to possible implementations, it is noted that the ability to resolve (or discern) one or more peaks within this step 703.1 is related to the number of elements of the virtual array signal, and thus to the number of (virtual) antenna elements. If the method 700 is executed on a virtual array signal with too few elements, the angular resolution may be so poor that multiple peaks cluster or coalesce.

Step 703 further includes a substep 703.2 of applying an inverse phase-shift vector $$a_t^*(\hat{\phi}_1) \otimes a_r^*(\hat{\phi}_1) = a_t(-\hat{\phi}_1) \otimes a_r(-\hat{\phi}_1)$$

to the virtual array signal. The inverse phase-shift vector is a Kronecker product of conjugates of the transmit and receive steering vectors. The transmit and receive steering vectors are oriented towards and away from the first leading peak of the angle spectrum. The phase of the conjugates of the transmit and receive steering vectors is the inverse $-\hat{\phi}_1$ of the phase $\hat{\phi}_1$ corresponding to the angle of the first leading peak. Applying the inverse phase-shift vector (e.g., by element-wise multiplication $\odot$) may be considered to correspond to a projection of the strongly varying virtual array signal v on a subspace corresponding to the first leading peak. If the range-Doppler bin contains a direct reflection, such a projection returns a signal component without phase shifts, that is, a constant term, which can then be conveniently subtracted. This is attempted a substep 703.3, in which a constant signal is subtracted that may or may not correspond to a constant term of the signal, depending on whether a direct reflection or a multipath artefact is at hand.

In formulas, the operation in 703.2 when acting on the signal (8) with two direct reflections can be written:

$$z_{two}(\phi_1, \phi_2) \odot \left[a_t^*(\hat{\phi}_1) \otimes a_r^*(\hat{\phi}_1)\right]$$

-continued $$= (s_1[a_t(\phi_1)\otimes a_r(\phi_1)] + s_2[a_t(\phi_2)\otimes a_r(\phi_2)] + n)\odot[a_t^*(\hat{\phi}_1)\otimes a_r^*(\hat{\phi}_1)]$$
$$= s_1[(a_t(\phi_1)\odot a_t^*(\hat{\phi}_1))\otimes(a_r(\phi_1)\odot a_r^*(\hat{\phi}_1))] + s_2[(a_t(\phi_2)\odot a_t^*(\hat{\phi}_1))\otimes(a_r(\phi_2)\odot a_r^*(\phi_1))] + n$$
$$= s_1[a_t(\phi_1-\hat{\phi}_1)\otimes a_r(\phi_1-\hat{\phi}_1)] + s_2[a_t(\phi_2-\hat{\phi}_1)\otimes a_r(\phi_2-\hat{\phi}_1)] + n$$

where the identity $(A\otimes B)\odot(C\otimes D)=(A\odot C)\otimes(B\odot D)$ was used in the second equality. If the estimate $\hat{\phi}_1$ is accurate, then $\hat{\phi}_1-\hat{\phi}_1=0$, and this expression will be equal to $$s_1 1 + s_2[a_t(\Delta\phi)\otimes a_r(\Delta\phi)] + n, \tag{10}$$

where $\Delta\phi=\hat{\phi}_2-\hat{\phi}_1$ will be referred to as an offset phase. The first term $s_1 1$ is a vector with all its $(M_t M)^2$ elements equal to $s_1$, hence a constant term. To carry out substep 703.3, the amplitude $s_1$ can be taken from the angle spectrum; alternatively, it may be possible to estimate the amplitude of the constant term directly from the intermediate signal v. The intermediate signal resulting after execution of substep 703.3 may be denoted $v_{two}$.

If instead the operation in substep 703.2 is applied to the signal (9) with two multipath reflections, one obtains:

$$z_{mp}(\phi_1,\phi_2)\odot[a_t^*(\hat{\phi}_1)\otimes a_r^*(\hat{\phi}_1)] = \ldots = s_{12}[1\otimes a_r(\Delta\phi)] + s_{21}[a_t(\Delta\phi)\otimes 1] + n, \tag{11}$$

where no constant term can be discerned. Because $x_{two}(\phi_1, \phi_2)$ and $x_{mp}(\phi_1, \phi_2)$ are not distinguishable until completion of the method 700, substep 703.3 is applied to (11), and the result is denoted by $v_{mp}$.

(The combination of substeps 703.2 and 703.3 may be imagined to be a nullspace projection. The matrix $$P(\hat{\phi}_1) = \frac{[a_t(\phi_1)\otimes a_r(\phi_1)][a_t(\phi_1)\otimes a_r(\phi_1)]^T}{|a_t(\phi_1)\otimes a_r(\phi_1)|^2}$$

represents a projection on a subspace corresponding to the peak at $\phi 1$ in the angle spectrum. The associated nullspace projection matrix is given by $$P^\perp(\hat{\phi}_1) = I - P(\hat{\phi}_1),$$

such that one may write the intermediate signal simply as $P^\perp(\hat{\phi}_1)z$.)

Next, in a step 705, a test signal w is provided by applying a further inverse phase-shift vector $$a_t^*(\hat{\phi}_1)\otimes a_r^*(\hat{\phi}_1)$$

(substep 705.2) and subtracting a further constant signal (substep 705.3). The inverse phase-shift vector $$a_t^*(\hat{\phi}_1)\otimes a_r^*(\hat{\phi}_1)$$

corresponds to an estimate $\Delta\hat{\phi}$ of the offset phase introduced above, which relates the first and a second leading peak in the angle spectrum of the virtual array signal.

In some embodiments, the estimate $\Delta\hat{\phi}$ of the offset phase is computed based on the angle spectrum of the virtual array signal, that is, by subtracting the phases corresponding to the angles of the two leading peaks.

In other embodiments, the estimate $\Delta\hat{\phi}$ of the offset phase is taken from an angle spectrum of the intermediate signal v. The angle spectrum is computed in a foregoing step 704. The angle spectrum may for example be computed based on the phase shifts among the signal values in, e.g., by performing an angle-FFT or AoA-FFT. In the angle spectrum, a leading peak is selected whose phase is determined (substep 705.1). The leading peak may be the peak with the greatest amplitude in the angle spectrum. It is clear from each of equations (10) and (11) that the phase of the leading peak will correspond to the offset phase.

In such embodiments of the method 700 where the angle spectrum of the intermediate signal v is computed, a preliminary guess on whether the signal relates to a direct reflection or to first-order multipath reflections can be carried out based on the number of peaks in said angle spectrum: if there is merely one peak, the signal is unlikely to contain a multipath reflection. The opposite inference is generally not valid. Such a preliminary guess is thus primarily useful for verifying or corroborating the final conclusion (step 707 or 708) of the complete method 700.

When substep 705.2 is applied to the intermediate signal $v_{two}$ for two targets, one obtains $$v_{two}\odot(a_t^*(\Delta\hat{\phi})\otimes a_r^*(\Delta\hat{\phi})) = s_2 1 + n. \tag{12}$$

The constant term $s_2 1$ is eliminated by the subtraction in substep 705.3, which returns the test signal w. In this case, it will generally be easy to determine the amplitude $s_2$ of the constant term because it is the only non-noise term in (12). The amplitude can be determined either from (12) by direct inspection, or it may be taken equal to the amplitude of the leading peak in the angle spectrum of the intermediate signal v. Further, the amplitude may be determined by estimating a DC (or non-oscillating) component of (12), computing the average, or computing the average of maxima and minima.

Assuming instead that substep 705.2 is applied to the intermediate signal $v_{mp}$ for the signal with two multipath reflections, no simple expression will be obtained. Direct inspection is probably not a viable way of estimating the amplitude of the constant signal to be subtracted, but the other options mentioned can be used.

The execution flow of the method 700 then reaches, in step 706, a decision point where it is detected whether the test signal w has any content in addition to noise n. If the test signal w has non-noise content, it is concluded, in step 707, that the virtual array signal z contained at least one first-order multipath artefact. (In some circumstances, this may even justify a conclusion that the first leading peak corresponds to a first-order multipath artefact.) Otherwise, if the test signal has noise content only, it is concluded, in step 708, that the first leading peak corresponds to a direct reflection in the scene.

In some embodiments, the detection in step 706 is carried out subject to a noise floor (example unit: 1 dB), in the sense that the test signal's w signal content below the noise floor is considered to be noise. Only content with greater signal power will lead to a positive outcome of the non-noise content detection. According to these embodiments, the noise floor used in step 706 is obtained for the virtual array signal z. The noise floor of the virtual array signal z may be obtained based on measurements on the virtual array signal z, or the noise floor may be taken from a specification (data sheet) of the TDM MIMO radar equipment by which provided the virtual array signal or its underlying data. It should be clear from the above mathematical derivations that the test signal w has the same noise content as the virtual array signal z; in particular, the noise does not undergo any non-unitary rescaling.

In other embodiments, step 706 may be carried out as a ratio test (substep 706.1) which compares a signal energy of the constant signal, which was subtracted (substep 705.3) from the intermediate signal, and a total signal energy of the intermediate signal v.

Figure 9:
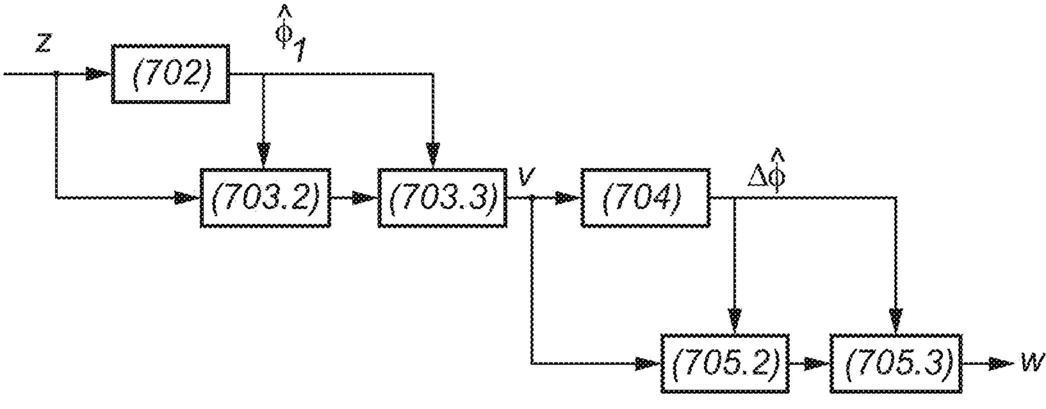
FIG. 9 is a signal processing diagram, which connects the steps of the method according to FIG. 7 to the input, output and intermediate data.

FIG. 9 summarizes the above-described computations in the form of an information flow generally from left to right. The virtual array signal z is processed by the substeps 703.2 and 703.3, each of which depends parametrically on the first leading peak (its estimated phase $\hat{\phi}_1$ and amplitude) in the angle spectrum computed in step 702. Also the operations in substeps 705.2 and 705.3, which are applied to the intermediate signal v, depend parametrically on the estimated offset phase $\Delta\hat{\phi}$. At least in some embodiments of the method 700, the leading peak in the angle spectrum of the intermediate signal v is used to provide said estimate of the offset phase and optionally the amplitude of the constant signal to be subtracted in substep 705.3 too.

From yet another perspective, the computations in steps 702-705 can be described as two iterative applications of an algorithm that removes the strongest peak. In pseudo instructions, this algorithm can be stated:

Algorithm1 input: virtual array signal x output: virtual array signal y $$S \leftarrow \text{angle spectrum}(x)$$

$$\hat{\phi} \leftarrow \text{argmax } S$$

$$\hat{s}_1 \leftarrow S(\hat{\phi})$$

$$y \leftarrow x - x \odot \left[a_t^*(\hat{\phi}) \otimes a_r^*(\hat{\phi})\right] - \hat{s}_1 1$$

In terms hereof, the intermediate signal and test signal are given by $$v = \text{ALGORITHM1}(z),$$

$$w = \text{ALGORITHM1}(v).$$

Figure 10:
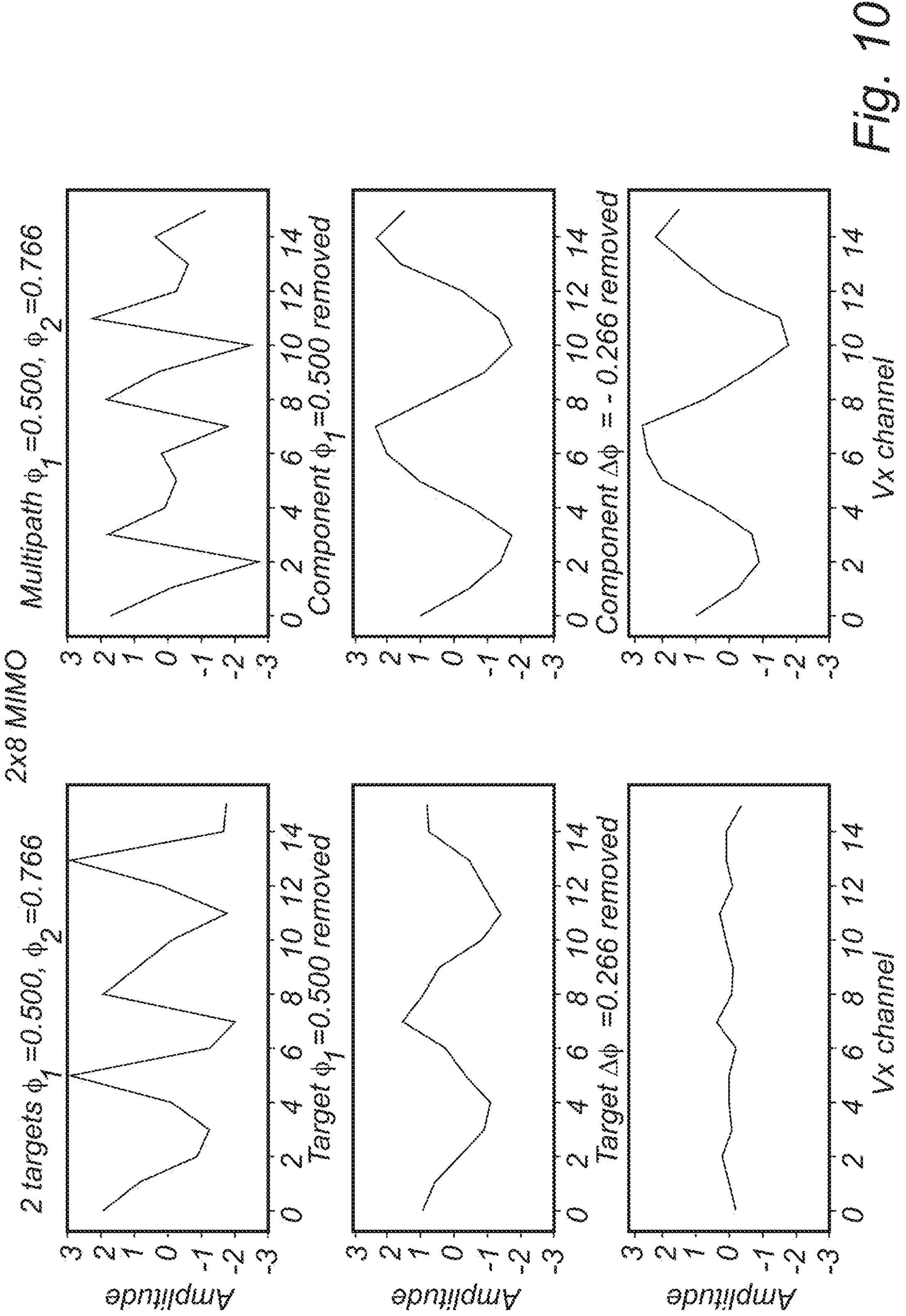
FIG. 10 are plots for a 2×8 MIMO radar of a virtual array signal (16 elements) after different processing steps have been obtained, wherein the left-hand column refers to imaging two targets by direct reflections and the right-hand column refers to two first-order multipath artefacts.
Figure 11:
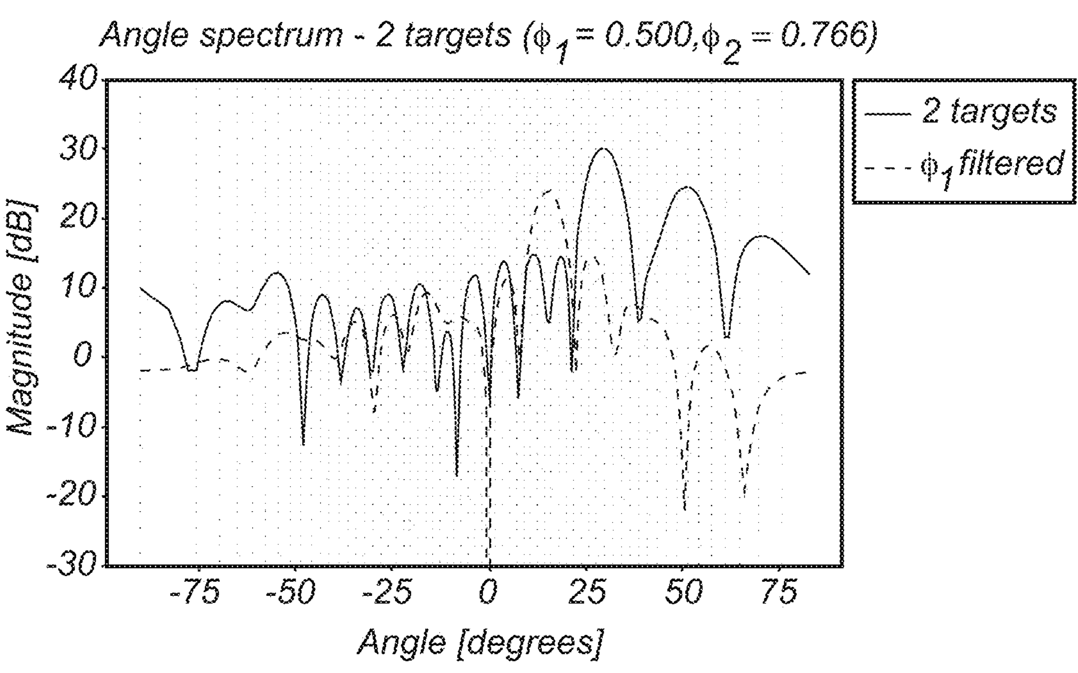
FIG. 11 shows, for a TDM MIMO FMCW radar imaging two targets, an angle spectrum before processing (solid line) and after removing the leading peak (dashed line)
Figure 12:
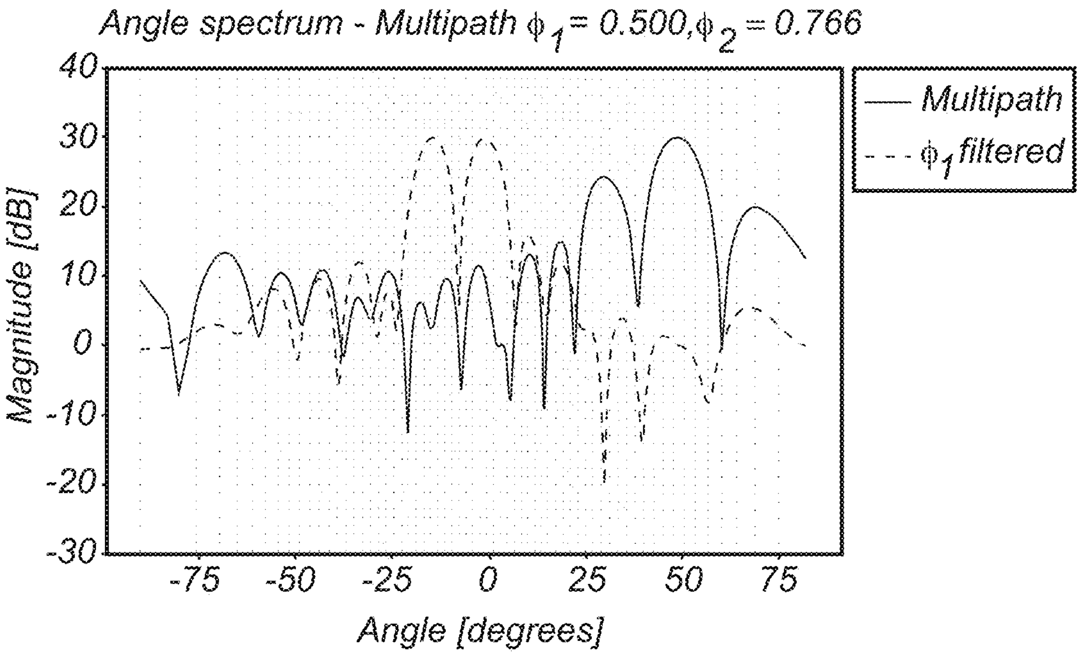
FIG. 12 shows, for a TDM MIMO FMCW radar capturing two first-order multipath artefacts, an angle spectrum before processing (solid line) and after removing the leading peak (dashed line)

FIGS. 10, 11 and 12 are plots of simulated data which illustrate a representative execution of the method 700. In detail, FIG. 10 shows respective outputs of the various steps of method 700 for two direct-reflection targets (left-hand column) and for two first-order multipath artefacts (right-hand column) for a 2×8 MIMO radar. Each abscissa refers to numbers of the sixteen elements of each signal, which are in a one-to-one relationship with the virtual antenna elements. The simulation is based on the following parameter values:

$$\theta_1 = 30°,\ \theta_2 = 50°,\ s_1 = s_{12} = 1 - j\sqrt{3},\ s_2 = s_{22} = 1.$$

For the wavelength under consideration, the angles correspond to phases $\phi_1$=0.500 and $\phi_2$=0.766, so that the offset phase becomes $\Delta\phi$=0.266. In the top row of FIG. 10, the ordinate shows the real part of the received signal. The middle row are plots of the respective intermediate signals $v_{two}$, $v_{mp}$. The bottom row shows the result after attempting to remove the two strongest components corresponding to the phase $\phi_1$ of the leading peak and the offset phase $\Delta\phi_1$. As expected, the result for the signal with the two direct-reflection targets is close to zero, whereas a variable component remains in the multipath case. A systematic way of determining whether the test signal for the two direct-reflection targets has non-noise content would be to determine a relevant noise floor, based on measurements or sensor performance, and then assess whether the deviations from zero are below the noise floor in power.

Accordingly, this simulation suggests that all non-noise content could be eliminated by two iterative nullspace projections in the direct-reflection case but not when the signal contains a first-order multipath artefact.

Based on the same simulated data set, FIGS. 11 and 12 provide an understanding of the effect that the first nullspace projection has on the TDM MIMO FMCW radar's angle spectrum. FIG. 11 shows this angle spectrum before any processing (solid line) and after removing the leading peak (dashed line) in the case of two direct reflections. FIG. 12 shows the same data for an angle spectrum of a similar radar that is capturing two first-order multipath artefacts, as well as possible further objects in the scene or further artefacts.

A further development of the method 700 is able to handle an exceptional case where the offset phase $\Delta\hat{\phi}$ corresponds to an AoA giving rise to a path-length difference equal to an integer number of wavelengths with respect to the first spacing $d_r$ of the physical receivers or to an AoD giving rise to a path-length difference equal to an integer number of wavelengths with respect to the second spacing $d_t$ of the physical transmitters. In other words, the exceptional case occurs when there is a particular geometric relationship between the angles of the objects (or artefacts) in the scene on the one hand and the transmitter spacing $d_t$ or receiver spacing $d_r$ on the other hand. This will cause the intermediate signal for the first-order multipath reflections Ump to contain one or two constant terms due to degeneracy of the steering vectors. More precisely, it is a fact that $$a_t(\Delta\phi) = \begin{bmatrix} 1 & e^{jd_t\Delta\phi} & e^{j2d_t\Delta\phi} & \dots \end{bmatrix} = 1$$

if $d_t\Delta\phi=2\pi n$ for some integer $n\in\mathbb{Z}$. As a consequence, the expression (11) is equal to $$s_{12}1 + s_{21}[a_t(\Delta\phi) \otimes 1] + n \tag{13}$$

and is thus indistinguishable from the expression (10). Similarly, if $d_t\Delta\phi=2\pi n'$ for some $n'\in\mathbb{Z}$, then $a_r(\Delta\phi)=1$ and expression (11) becomes $$s_{12}[1\otimes a_r(\Delta\phi)]+s_{21}1+n. \quad (14)$$

The degeneracy condition $$d_r\Delta\phi=2\pi n \text{ or } d_t\Delta\phi=2\pi n'$$

is, by an application of (1), equivalent to $$d_r(\sin\theta_2-\sin\theta_1)=\lambda n \text{ or } d_t(\sin\theta_2-\sin\theta_1)=\lambda n'.$$

Without loss of generality, by a rotation of the coordinate axes such that sin 01=0, this is in turn equivalent to $$d_r\sin\theta_0=\lambda n \text{ or } d_t\sin\theta_0=\lambda n',$$

where the left-hand sides represent the path-length differences at the transmitter and receiver array, respectively. The angle $\theta_0$ is an imaginary AoA corresponding to the offset phase $\Delta\phi$, which corresponds to the leading peak of the angle spectrum of the intermediate signal v. In other words, the exceptional case occurs when the offset phase $\Delta\hat{\phi}$ corresponds to an angle giving rise to a path-length difference equal to an integer number of wavelengths with respect to the first spacing $d_r$ of the physical receivers or with respect to the second spacing $d_t$ of the physical transmitters.

In the further development of the method 700, if it is determined that the exceptional case (degeneracy) is at hand, the execution of the method 700 may be aborted for this range-Doppler bin. Optionally, a message notifying the user that the method is unable to reliably resolve the first-order multipath ambiguity may be generated when the execution is aborted.

Figure 13:
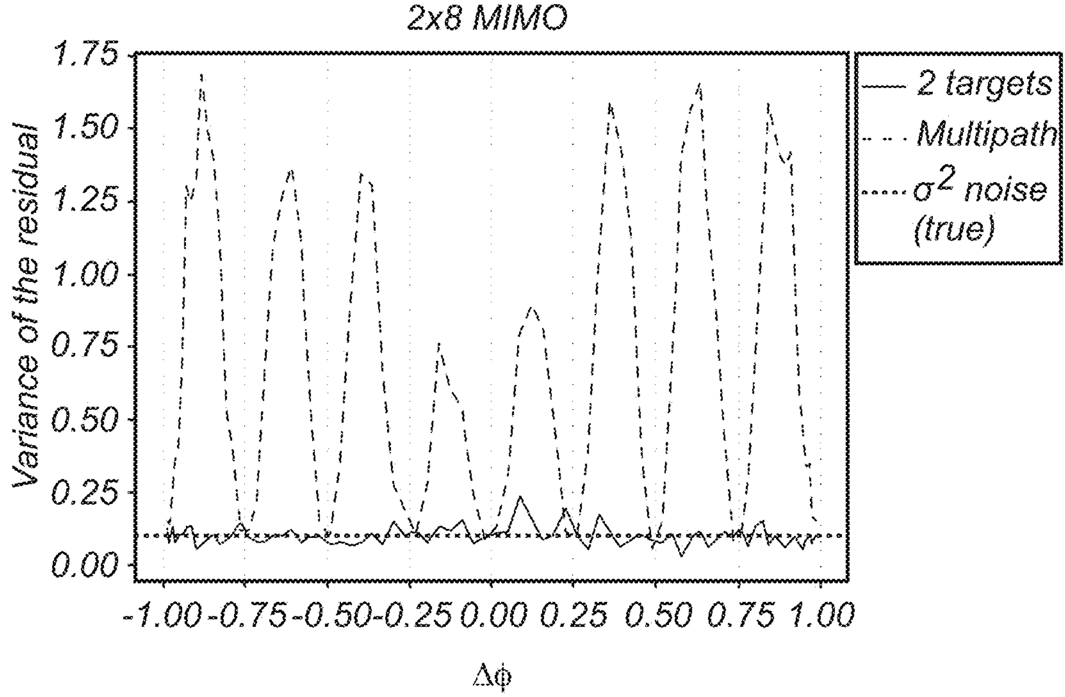
FIG. 13 illustrates an exceptional case (degeneracy) for which special measures may be required to discriminate a target detection from a first-order multipath detection.

FIG. 13 refers to a simulation of a 2×8 MIMO radar where a first target was placed at $\theta_1=0$ and the second target was swept such that sin $\theta_2$ varies over the range (−1,1). The variance (signal power) of the test signal after the two leading components of the virtual array signal are removed by steps 702-705 is plotted as a function of the offset phase $\Delta\phi$ in FIG. 13. The dotted vertical lines indicate those values for which it is not possible to resolve the multipath ambiguity by a straightforward application of the method 700.

Figure 8:
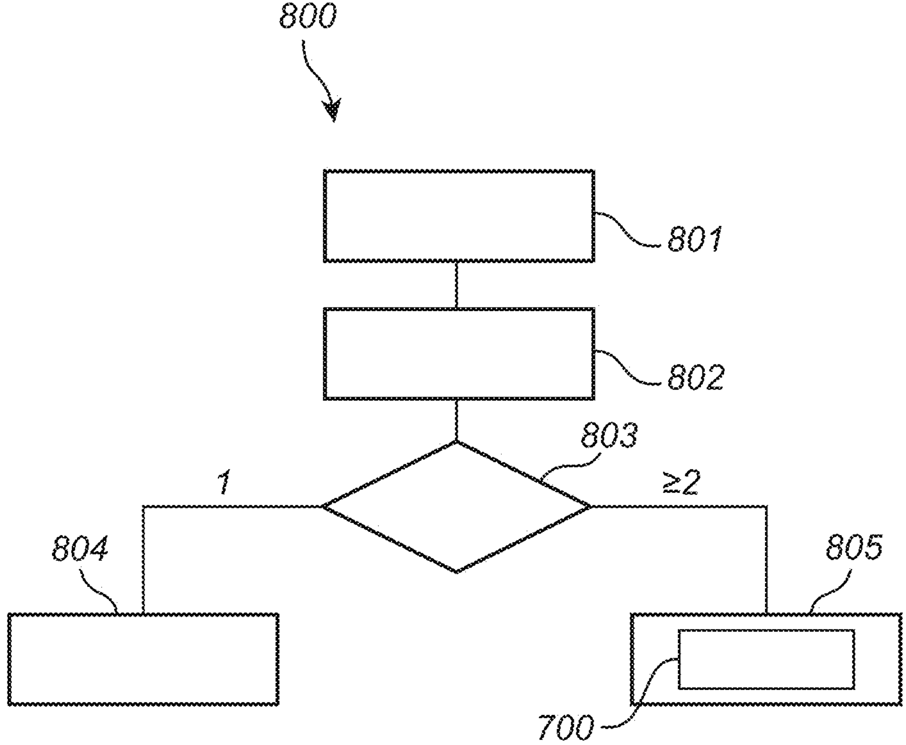
FIG. 8 is a flowchart of a method for resolving a first-order or second-order multipath ambiguity for a virtual array of a TDM MIMO FMCW radar, according to embodiments herein.

As suggested by the flowchart in FIG. 8, the method 700 for resolving a first-order multipath ambiguity can be embedded in a method 800 for resolving a first- or second-order multipath ambiguity. It is envisioned to utilize the method 800 in technical applications similar to those discussed above for the method 700.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of resolving a first-order multipath ambiguity for a virtual array of a time-division multiplexing (TDM) multiple-input multiple-output (MIMO) frequency-modulated continuous-wave (FMCW) radar, wherein the TDM MIMO FMCW radar comprises at least one row of physical receivers with a first spacing d_r in a first direction, and further comprises a plurality of physical transmitters arranged with a second spacing d_t in said first direction, the method comprising:

obtaining, from the TDM MIMO FMCW radar, a virtual array signal z of a range-Doppler bin relating to a scene, each element of the virtual array signal corresponding to one virtual antenna element of the virtual array;

computing an angle spectrum for the range-Doppler bin;

providing an intermediate signal v by:

selecting a first leading peak in the angle spectrum of the virtual array signal, applying to the virtual array signal an inverse phase-shift vector a_t^*(ϕ^_1)⊗a_r^*(ϕ^_1) corresponding to an estimated phase ϕ^_1 of the first leading peak, and subtracting a constant signal with an amplitude corresponding to the first leading peak;

providing a test signal w by:

applying to the intermediate signal an inverse phase-shift vector a_t^*(Δϕ^)⊗a_r^*(Δϕ^) corresponding to an estimated offset phase Δϕ^, which relates the first and a second leading peak in the angle spectrum of the virtual array signal, wherein the first and second leading peaks are the two largest peaks in the angle spectrum, and subtracting a constant signal;

detecting non-noise content of the test signal;

if the test signal has non-noise content, concluding that the virtual array signal contains a first-order multipath artefact and, in response, excluding the first leading peak from subsequent radar processing for the range-Doppler bin; and, if the test signal has noise content only, concluding that the first leading peak corresponds to a direct reflection in the scene and, in response, including the first leading peak in the subsequent radar processing for the range-Doppler bin.

2. The method of claim 1, wherein the offset phase Δϕ^ is computed based on the angle spectrum of the virtual array signal.

3. The method of claim 1, further comprising:

computing an angle spectrum of the intermediate signal v, and selecting a leading peak in the angle spectrum of the intermediate signal, wherein said leading peak has the greatest amplitude in the angle spectrum, wherein the offset phase Δϕ^ corresponds to an estimated angle of the selected leading peak.

4. The method of claim 3, wherein the constant signal subtracted from the intermediate signal has an amplitude corresponding to the selected leading peak.

5. The method of claim 1, wherein the detection of non-noise content includes a ratio test which compares a signal energy of the constant signal, which is subtracted from the intermediate signal, and a total signal energy of the intermediate signal v.

6. The method of claim 1, further comprising:

obtaining a noise floor of the virtual array signal z, wherein the detection of non-noise content of the test signal w is performed subject to the noise floor.

7. The method of claim 1, wherein the ratio of the first and second spacings $d_t$, $d_r$ is such that the virtual antenna elements of the virtual array are equidistant in the first direction.

8. The method of claim 1, wherein computing each angle spectrum includes performing a Fast Fourier Transform (FFT) with respect to consecutive virtual antenna elements.

9. The method of claim 1, further comprising:

assessing whether the offset phase $\Delta\hat{\phi}$ corresponds to an angle giving rise to a path-length difference of an integer number of wavelengths with respect to the first spacing $d_r$ of the physical receivers or the second spacing $d_t$ of the physical transmitters.

10. The method of claim 1, further comprising:

obtaining a virtual array signal x relating to a scene, each element of the virtual array signal corresponding to one virtual antenna element of a virtual array of the TDM MIMO FMCW radar;

computing an angle spectrum for one range-Doppler bin of the virtual array signal;

counting the number of peaks in the angle spectrum;

if the angle spectrum has a single peak, concluding that it corresponds to a second-order multipath artefact or a direct reflection in the scene; and if the angle spectrum has at least two peaks, concluding that it corresponds to two first-order multipath artefacts or two direct reflections in the scene.

11. A signal processing device for a time-division multiplexing (TDM) multiple-input multiple-output (MIMO) frequency-modulated continuous-wave (FMCW) radar, wherein the TDM MIMO FMCW radar comprises at least one row of physical receivers with a first spacing $d_r$ in a first direction, and further comprises a plurality of physical transmitters arranged with a second spacing $d_t$ in said first direction, the signal processing device comprising:

processing circuitry configured to resolve, in a virtual array signal comprising at least one range-Doppler bin, a first-order multipath ambiguity for a virtual array of the TDM MIMO FMCW radar by performing operations comprising:

obtaining, from the TDM MIMO FMCW radar, a virtual array signal z of a range-Doppler bin relating to a scene, each element of the virtual array signal corresponding to one virtual antenna element of the virtual array;

computing an angle spectrum for the range-Doppler bin;

providing an intermediate signal v by:

selecting a first leading peak in the angle spectrum of the virtual array signal, applying to the virtual array signal an inverse phase-shift vector $\hat{a}_t^*(\hat{\phi}_1)\otimes\hat{a}_r^*(\hat{\phi}_1)$ corresponding to an estimated phase $\hat{\phi}_1$ of the first leading peak, and subtracting a constant signal with an amplitude corresponding to the first leading peak;

providing a test signal w by:

applying to the intermediate signal an inverse phase-shift vector $\hat{a}_t^*(\Delta\hat{\phi})\otimes\hat{a}_r^*(\Delta\hat{\phi})$ corresponding to an estimated offset phase $\Delta\hat{\phi}$, which relates the first and a second leading peak in the angle spectrum of the virtual array signal, wherein the first and second leading peaks are the two largest peaks in the angle spectrum, and subtracting a constant signal;

detecting non-noise content of the test signal;

if the test signal has non-noise content, concluding that the virtual array signal contains a first-order multipath artefact and, in response, excluding the first leading peak from subsequent radar processing for the range-Doppler bin; and, if the test signal has noise content only, concluding that the first leading peak corresponds to a direct reflection in the scene and, in response, including the first leading peak in the subsequent radar processing for the range-Doppler bin.

12. A non-transitory computer-readable medium storing instructions which, when executed by a signal processing device having a processor and a memory, cause the signal processing device to carry out a method of resolving a first-order multipath ambiguity for a virtual array of a time-division multiplexing (TDM) multiple-input multiple-output (MIMO) frequency-modulated continuous-wave (FMCW) radar, wherein the TDM MIMO FMCW radar comprises at least one row of physical receivers with a first spacing $d_r$ in a first direction, and further comprises a plurality of physical transmitters arranged with a second spacing $d_t$ in said first direction, the method comprising:

obtaining, from the TDM MIMO FMCW radar, a virtual array signal z of a range-Doppler bin relating to a scene, each element of the virtual array signal corresponding to one virtual antenna element of the virtual array;

computing an angle spectrum for the range-Doppler bin;

providing an intermediate signal v by:

selecting a first leading peak in the angle spectrum of the virtual array signal, applying to the virtual array signal an inverse phase-shift vector $\hat{a}_t^*(\hat{\phi}_1)\otimes\hat{a}_r^*(\hat{\phi}_1)$ corresponding to an estimated phase $\Delta\hat{\phi}_1$ of the first leading peak, and subtracting a constant signal with an amplitude corresponding to the first leading peak;

providing a test signal w by:

applying to the intermediate signal an inverse phase-shift vector $\hat{a}_t^*(\Delta\hat{\phi})\otimes\hat{a}_r^*(\Delta\hat{\phi})$ corresponding to an estimated offset phase $\Delta\hat{\phi}$, which relates the first and a second leading peak in the angle spectrum of the virtual array signal, wherein the first and second leading peaks are the two largest peaks in the angle spectrum, and subtracting a constant signal;

detecting non-noise content of the test signal;

if the test signal has non-noise content, concluding that the virtual array signal contains a first-order multipath artefact and, in response, excluding the first leading peak from subsequent radar processing for the range-Doppler bin; and, if the test signal has noise content only, concluding that the first leading peak corresponds to a direct reflection in the scene and, in response, including the first leading peak in the subsequent radar processing for the range-Doppler bin.

* * * * *